July 7, 1925.

J. S. HARRISON

MOLDING APPARATUS

Filed May 24, 1924

INVENTOR

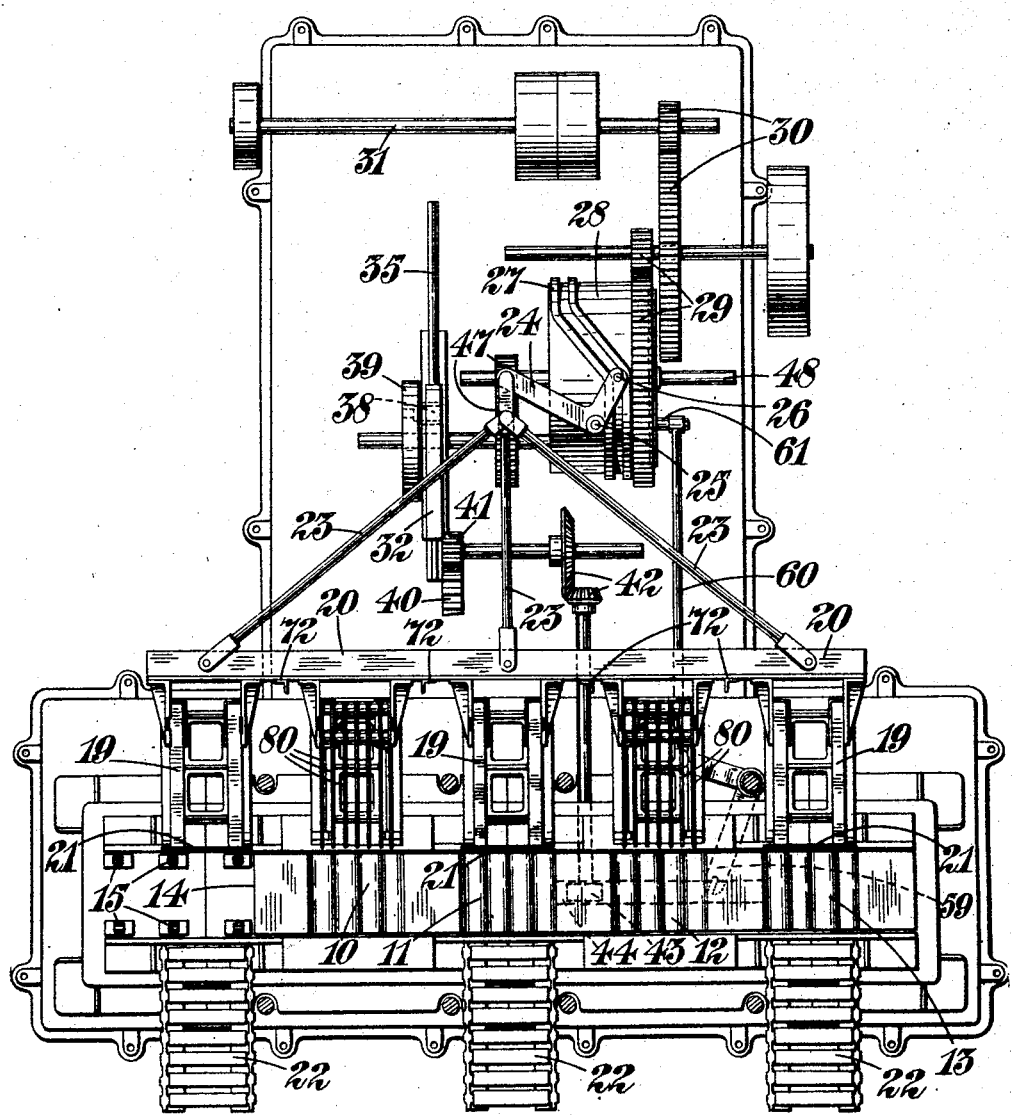

July 7, 1925.

J. S. HARRISON

MOLDING APPARATUS

Filed May 24, 1924 3 Sheets-Sheet 3

1,545,255

INVENTOR

Patented July 7, 1925.

1,545,255

UNITED STATES PATENT OFFICE.

JOHN STANLEY HARRISON, OF LONDON, ENGLAND, ASSIGNOR TO MACNAB STRATIFIED COAL LIMITED, OF LONDON, ENGLAND, A BRITISH COMPANY.

MOLDING APPARATUS.

Application filed May 24, 1924. Serial No. 715,617.

*To all whom it may concern:*

Be it known that I, JOHN STANLEY HARRISON, a subject of the King of England, residing in London, England, have invented certain new and useful Improvements in Molding Apparatus, of which the following is a specification.

This invention is for improvements in or relating to molding apparatus for consolidating powdered or plastic material into block form, for example in the manufacture of fuel briquettes. The invention deals with a machine of the type in which the consolidation of the material is effected wholly or partly by a pressure-plunger (e. g. a dead-weight plunger) operating on the top of the material in the mold and in which means are provided for side-stepping the mold into and out of register with the pressure-plunger and for ejecting the compressed block when the mold is in the side-stepped position.

According to the present invention the mold is trough-shaped and when under the plunger has its open ends closed by fixed walls which are so shaped and positioned as to register with said open ends when the mold is in the presssure position but to be clear of said ends when the mold is side-stepped. The ejection of the compressed block is effected by an ejector movable in a direction transverse to the sideways movement of the mold into and out of the space occupied by the throughway of the trough-shaped part when the latter is in the side-stepped position.

In the preferred form of the invention there are two trough-shaped molds movable sideways as a unit to bring each mold in turn under the same pressure-plunger and into register with the fixed walls aforesaid as the companion mold is side-stepped therefrom, and operating in conjunction with the molds are two ejectors movable as a single unit in a direction transverse to the path of the molds into and out of the spaces which will in turn be occupied by the throughway of the side-stepped mold.

According to a feature of the invention a measuring-box is operatively connected to the ejector-unit for movement thereby between a position in which it is arranged to receive a measured charge of material and one in which it is arranged to deliver said charge to the mold which is under the plunger.

According to a further feature of the invention the sideways movement of the molds and the advance and withdrawal of the ejector-unit are periodically effected by means (e. g. cam-actuated means) operated in step from a single continuously-running driving member.

A molding machine embodying the foregoing and other features of the invention will now be described by way of example with reference to the accompanying drawings, in which—

Figure 2 is a plan view showing the mechanical gear for operating the various moving parts of the machine;

Like reference numerals indicate like parts in the different figures. The various parts of the machine such as shaft bearings and the like have been omitted from the drawings for the sake of clearness.

Figure 1:
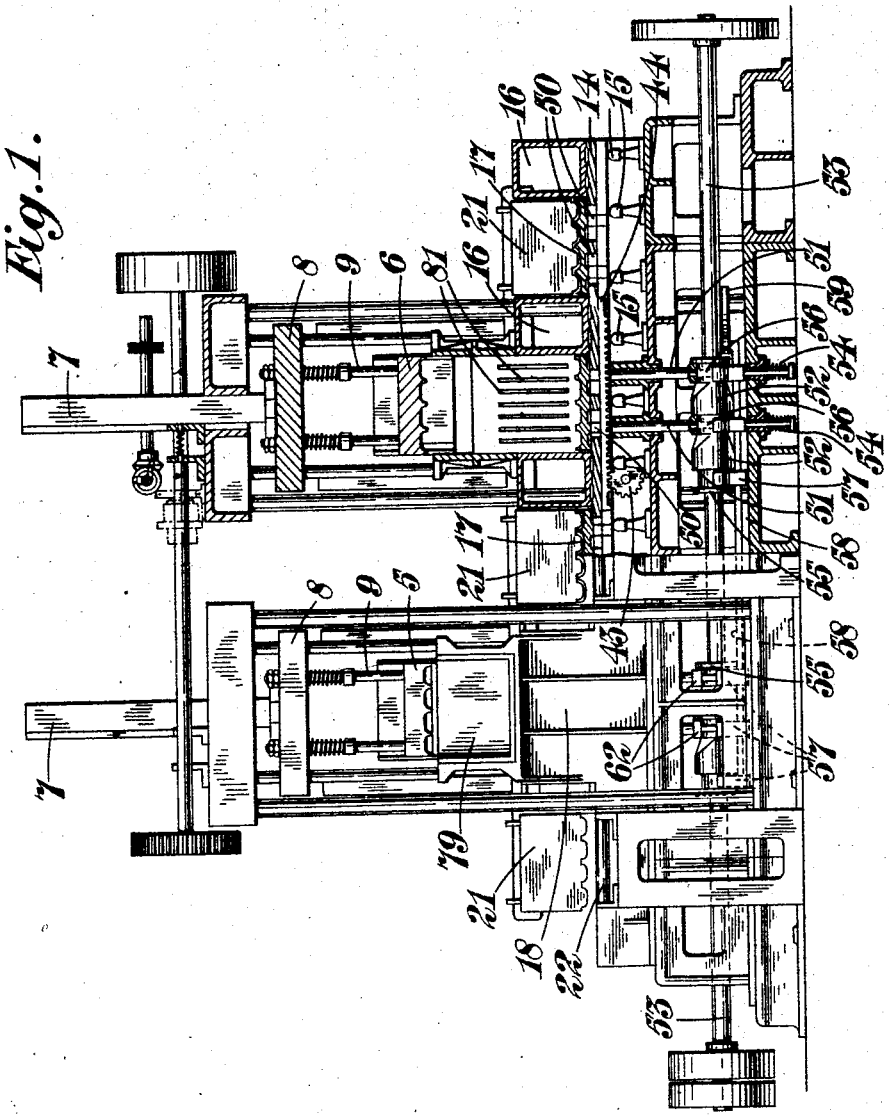
Figure 1 is a front view of the machine with the right-hand unit shown as a central vertical section through the mold-table.

The apparatus illustrated is a two-unit machine designed for the manufacture of fuel briquettes. There are two pressure-plungers 5, 6, appropriate respectively to the left and right hand units of the machine. The plungers are adapted to be raised by rack-and-pinion elevator mechanism whereof the racks are formed on vertical bars 7 extending upwardly from dead-weights 8 to which the plungers are resiliently connected by spring-pressed bolts 9. Means, which do not form part of the present invention, are provided to control the operation of the elevator mechanism so that the pressure-plungers are periodically raised, maintained in the raised position for a predetermined time and then released.

There are four molds 10, 11, 12, 13 (numbered consecutively from left to right in Figure 2) arranged in line and supported on a table 14 which is mounted on rollers 15 for to-and-fro movement in a horizontal direction. The four molds are thus coupled together and movable sideways as a single unit. The molds operate in pairs, 10 and 11 being appropriate to the left-hand unit of the machine and co-operating with the pressure-plunger 5, while the molds 12, 13 operate in conjunction with the plunger 6 of the right-hand unit.

The throughway of each mold is trough-shaped, being formed between end-pieces 16 which separate the several molds. The bottom of each mold is formed as a movable pallet 17 slidable vertically within the mold and adapted, by means hereinafter described, to receive a rapid reciprocatory movement of comparatively short throw, while the mold is under the plunger. The consolidation of the material in the molds is effected partly by the application of top pressure thereto by the plungers 5, 6 and partly by the tamping or jigging action of the pallets 17.

When a mold is in position under the corresponding plunger its open ends (i. e. the open ends of the trough) are closed by fixed mold plates 18 which register with said ends but are clear of the ends of the companion mold which is in the side-stepped position. In the drawings the mold table 14 is shown at the right-hand limit of its travel and as will be seen the left-hand mold of each pair is under the corresponding pressure-plunger and in register with the fixed end plates 18 while the right-hand mold is side-stepped therefrom. When the mold-table is moved to the left-hand limit of its travel in order to bring the previously side-stepped molds (i. e. 11, 13) under the pressure-plungers, the molds 10, 12 containing the compressed blocks are side-stepped to the left of their respective pressure-plungers. It will be seen therefore that as the mold-table is alternately moved to the left and then to the right the side-stepped mold of each pair occupies alternately positions on opposite sides of the corresponding plunger. The two units of the machine are so disposed in relation to each other that the position occupied by the side-stepped mold of the left-hand pair when the mold-table is moved to the right is coincident with the position occupied by the side-stepped mold of the right-hand pair when the mold-table is moved to the left. There are thus only three separate side-stepped positions, the central one of which is common to both units. Located at the back of the molds and opposite the three side-stepped positions aforesaid are three block-ejectors 19 which are supported on a carrier 20 guided for movement in a direction transverse to the path of the mold-table. The three ejectors are movable as a single unit into and out of the three side-stepped positions aforesaid, that is into and out of three spaces of which two will always be occupied by the throughways of the side-stepped molds. Each ejector is formed with a front plate 21 having its lower edge conforming to the profile of the bottom pallet of the mold. At the front of the molds and opposite the three side-stepped positions thereof are three roller frames 22 adapted to receive the finished blocks as they are ejected from the side-stepped molds by the advance of the ejector-unit.

The mechanism for operating the various moving parts of the machine will now be described.

*Ejector-unit.*

The ejector-carrier 20 is operatively connected by rods 23 to one arm of a bell-crank lever 24 which is pivotally mounted at its fulcrum 25 to a fixed part of the machine frame. The other arm of this lever carries a roller 26 which in turn engages with and constitutes a follower for a scroll cam 27 formed on the periphery of a rotatable drum 28. During the operation of the machine the drum 28 is constantly rotated by means of toothed gearing 29, 30, from a main shaft 31 which constitutes the continuously-running driving member hereinbefore referred to. The cam profile is such that during the continued rotation of the drum 28 the ejector-unit is periodically advanced so as to move the ejectors into the troughs of the side-stepped molds, to maintain them in this position for a certain interval and then to withdraw the ejector-unit. The advance and withdrawal of the ejector-unit is synchronized with the sideways movement of the molds so that the ejectors come into operation immediately the mold-table comes to rest at one or other limit of its travel.

*Mold-table.*

Figure 4:
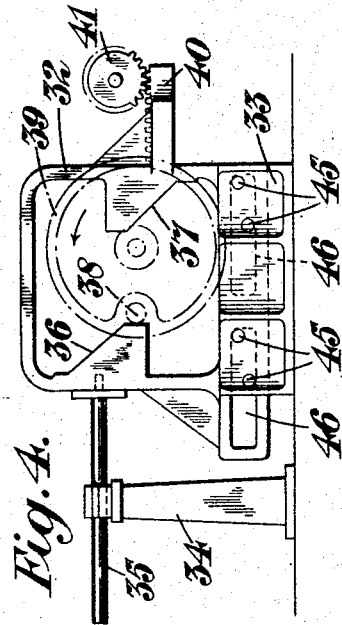
Figure 4 is a view on a larger scale illustrating the device employed for transmitting a reciprocatory movement to the molds.

The reciprocating mechanism for the mold-table (see Figures 2 and 4) comprises a yoke member 32 guided for reciprocation in a straight line path by a U-shaped bed plate 33 on which the base of the yoke slides and by a bearing standard 34 engaging a rod 35 which extends from the yoke member in the direction of its length. The yoke is formed with two opposed cam faces 36, 37 separated by a gap and extending in a direction obliquely across the path to which the yoke is constrained by its guides. Co-operating with the yoke member 32 is a crank pin 38 extending laterally from a rotatable disc 39 and adapted to impart a reciprocatory movement to the yoke by engagement first with one of the opposed faces 36, 37 and then with the other. The two cam faces are so spaced apart in a direction parallel to the path of the yoke as to provide for a dwell between the disengagement of the crank pin from one face and its engagement with the opposite face. It will be seen that the yoke 32 virtually constitutes a slotted link with lost motion between the crank pin and the sides of the slot. The reciprocatory motion of the yoke is transmitted to the mold-table by means of a rack-bar 40 secured to and extending in the direction of the length of the yoke member and engaged by a pinion 41 from which the reciprocating drive is in turn transmitted by bevel gearing 42 to a pinion 43 which engages a rack 44 secured to the underside of the mold-table. The crank disc 39 is continuously driven by meshing gear wheels 47 from a shaft 48 on which the drum 28 is mounted. The movement of the yoke in each direction is limited by fixed stops 45 which are secured to the upright wings of the U-shaped bearing 33 and pass through slots 46 at the lower end of the yoke. The stops 45 prevent overrunning of the yoke and ensure accurate registration of the molds with the pressure-plungers and the ejectors.

Mold-pallets.

Each bottom pallet 17 is formed with two pairs of downwardly projecting studs 50, which, in the pressure position of the mold, register with the upper ends of two corresponding pairs of tappets 51 arranged in co-operation wtih cams 52 rotatable by a shaft 53 extending longitudinally at the lower end of the machine. The tappets 51 are constrained to follow the cams by means of springs 54 which press the tappets downwardly and maintain bridge pieces 62, which interconnect the front and back tappets of each pair, in contact with the upper surfaces of the operating cams. The cams 52 are formed on or secured to a sleeve 55 which is keyed to the shaft 53 so as to be rotatable therewith but axially slidable thereon. Each cam is formed with a tapering portion as shown which terminates in a plain cylindrical part 56. The two cam sleeves 55 are coupled together for axial movement as a single unit by means of half-bearings 57 connected by a rod 58. The position of the rod 58, and thus the position of the cams in relation to the tappets, is controlled by a bell-crank lever 59 one arm of which engages the connecting rod 58, and the other is connected to a link 60 carrying at its free end a cam follower 61 which engages a face-cam on the drum 28. The cam shaft 53 is driven from the main shaft 31 hereinbefore referred to or from another continuously-running shaft (not shown) from which the drive also passes to the main shaft 31. When the tappets 51 are in the position shown in Figure 1, that is when their lower ends are in contact with the plain cylindrical portions 56 of the cam-sleeves, rotation of the cam shaft does not impart any vertical movement to the tappets and the bottom pallets of the molds thus remain stationary. The face-cam on the drum 28 is so arranged as regards its phase of operation in relation to that of the reciprocating mechanism for the mold-table that the operating cams for the bottom pallets are brought into the Figure 1 position immediately prior to the side-stepping of the mold-table and are held in this position during the side-stepping movement. When the mold-table is again at rest the face-cam on the drum 28 operates to slide the cam sleeves 55 to the right in Figure 1, and a rapid reciprocatory movement is then imparted to the bottom pallets of the molds. As the cam lobes are gradually increased in size from right to left, on movement of the cam-sleeves in this direction the throw imparted to the tappets is gradually increased from zero to a maximum and on movement of the sleeves from left to right the reverse variation takes place.

Feeding and measuring apparatus.

Figure 3:
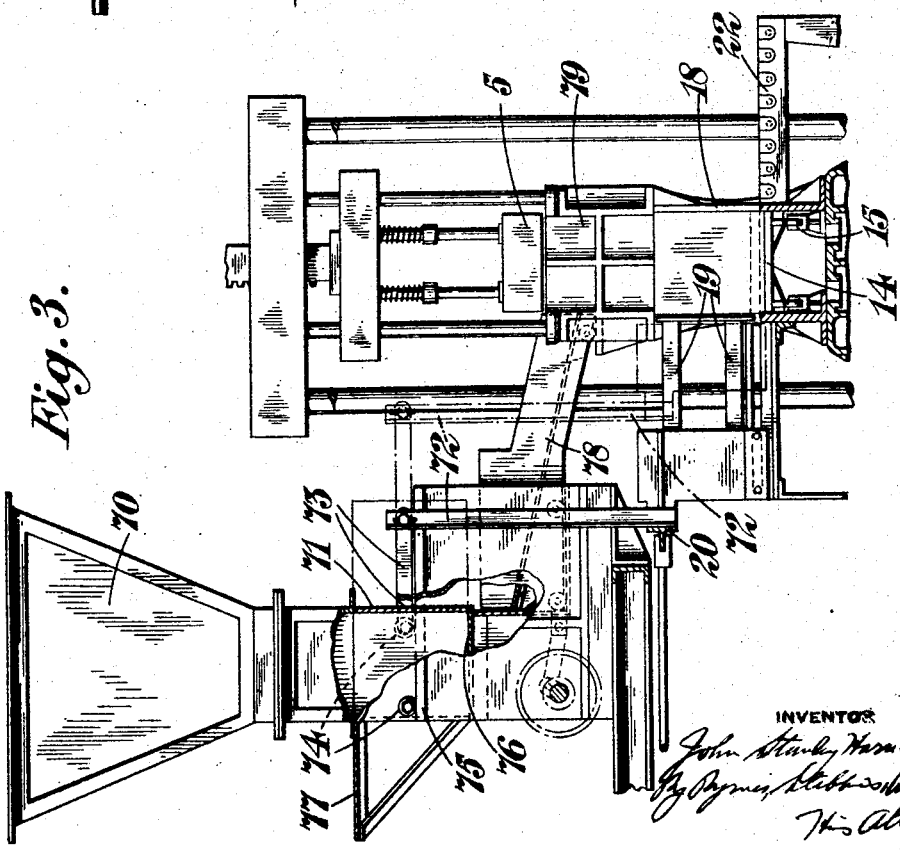
Figure 3 is an end elevation (partly in section) showing one of the measuring-boxes and the method by which the material is fed into the molds.

A constant supply of the material to be briquetted is maintained in the hopper 70 (Figure 3). Below the hopper is a measuring device in the form of a hollow box 71 open at both ends and operatively connected to the ejector-unit for movement therewith by means of rigid upright bars 72, the upper ends of which are pivotally connected to the sides of the box by links 73. The box is supported and guided in its to-and-fro movement by rollers 74 which run on fixed ledges 75. When the open upper end of the box is is in register with the discharge mouth of the hopper the lower end of the box is closed by a fixed plate 76. When the box is in this position it receives its charge of material from the hopper. At the upper end of the box is a rearwardly extending ledge 77 adapted on the forward movement of the measure to cut off communication between the hopper and the interior of the box. When the latter is fully advanced the discharge mouth of the hopper is completely closed by the ledge 77, and as the box is advanced its lower end is uncovered by the plate 76 and the contents of the box fall on to an inclined vibratory chute 78 which delivers the material into a fixed box-shaped part 79 surmounting and constituting an upward extension of the movable mold when the latter is in the pressure position. When the ejector-unit is next withdrawn the measuring-box is moved back into the position shown in Figure 3 ready to receive a fresh charge. It will be understood that there is a separate measuring-box, supply-hopper and delivery chute with their associated parts for each unit of the machine.

It has hitherto been proposed for the purpose of producing laminations in the finished block to employ a plurality of parallel vertical blades located in the mold during the initial stage of the consolidation of the material therein. A device of this kind may if desired be used in conjunction with the present machine and in the example illustrated such a device is provided. The blades 80 are mounted on the ejector-carrier 20 opposite the positions occupied by the molds when under their respective plungers, and in register with slots 81 in the fixed end walls 16 at the back of the molds. The two sets of blades 80 are thus located in the same relative positions along the carrier 20 as the measuring boxes 71. The blades are movable with the ejectors and on the advance of the latter (and therefore also of the measuring boxes) they enter the molds through the slots 81 and remain in this position until the ejector-unit is withdrawn.

The general sequence of operations of the machine as a whole is as follows:—

The measuring boxes 71, filled with the material to be consolidated (e. g. coal-dust mixed with a binding medium such as bitumen), the laminating or stratifying blades 80 and the ejectors 19 are moved forward simultaneously by the advance of the carriage 20. Thus as the blades 80 enter the molds under the plungers and the measured charges are delivered to said molds, the ejectors enter the side-stepped molds and eject the finished blocks therefrom. The connecting rod 58 is now thrown over by the face-cam on the drum 28 and the tappet-actuating cams 52 come into operation to oscillate the bottom pallets 17 of the molds under the plungers. The ejector-unit and with it the stratifying blades and the measuring boxes is now withdrawn, the pressure-plungers 5, 6 are released and allowed to fall on to the top of the material in the molds and this condition is maintained for a predetermined time sufficient for the required consolidation of the blocks. Oscillation of the bottom pallets is then stopped, the pressure-plungers are raised and the cam yoke 32 side-steps the mold-table. The same sequence of operations is then repeated. It will be understood that the machine operates continuously, the various operations described above being effected automatically by the continuous rotation of the main driving shaft.

It will be appreciated that the apparatus hereindescribed is only given by way of example and may be modified in many ways without departing from the scope of the invention.

I claim:

1. In molding apparatus of the type specified the combination with a pressure-plunger of a trough-shaped mold, means to move said mold sideways clear of the pressure-plunger, fixed walls so shaped and positioned as to close the open ends of the mold when the latter is under the plunger but to be clear of said ends when the mold is side-stopped, and an ejector movable in a direction transverse to the sideways movement of the mold into and out of the space occupied by the throughway of the trough-shaped part when said part is in the side-stepped position.

2. In molding apparatus of the type specified the combination with a pressure-plunger of two trough-shaped molds, means to move said molds sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors and means to move said ejectors as a single unit in a direction transverse to the path of the molds into and out of the spaces which will in turn be occupied by the throughway of the side-stepped mold.

3. In molding apparatus of the type specified the combination with a pressure-plunger of two trough-shaped molds, means to move said molds sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors, means to move said ejectors as a single unit in a direction transverse to the path of the molds into and out of the spaces which will in turn be occupied by the throughway of the side-stepped mold, and a measuring-box operatively connected to the ejector-unit for movement thereby between a position in which it is arranged to receive a measured charge of material and one in which it is arranged to deliver said charge to the mold under the plunger.

4. In molding apparatus of the type specified the combination with a pressure-plunger of two trough-shaped molds, movable sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors movable as a single unit in a direction transverse to the path of the molds into and out of the spaces which will in turn be occupied by the throughway of the side-stepped mold, a continuously-running driving member, and means operated thereby periodically to effect the sideways movement of the molds and the advance and withdrawal of the ejector-unit.

5. In molding apparatus of the type specified the combination with a pressure-plunger of two trough-shaped molds, movable sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors movable as a single unit in a direction transverse to the path of the molds into and out of the spaces which will in turn be occupied by the throughway of the side-stepped mold, a continuously-running driving member, means cam-actuated from said member for effecting the periodic advance and withdrawal of the ejector-unit, and a rack-and-pinion reciprocating mechanism for the molds operated from the continuously-running member aforesaid.

6. In molding apparatus of the type specified the combination with a pressure-plunger of two trough-shaped molds, means to move said molds sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors, means to move said ejectors as a single unit in a direction transverse to the path of the molds into and out of the spaces which will in turn be occupied by the throughway of the side-stepped mold, and a plurality of parallel vertical blades carried by the ejector-unit for movement therewith and so positioned thereon as to register with slots in the adjacent fixed end-wall of the mold and to enter the mold through said slots on the advance of the ejector-unit.

7. In molding apparatus of the type specified the combination with a pressure-plunger of two trough-shaped molds, movable sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors movable as a single unit in a direction transverse to the path of the molds into and out of the spaces which will in turn be occupied by the throughway of the side-stepped mold, a measuring-box operatively connected to the ejector-unit for movement thereby between a position in which the box is arranged to receive a measured charge of material and one in which it is arranged to deliver said charge to the mold under the plunger, a plurality of parallel vertical blades carried by the ejector-unit for movement therewith and so positioned thereon as to register with slots in the adjacent fixed end-wall of the mold and to enter the mold through said slots on the advance of the ejector-unit and means cam-operated from a continuously-running driving member periodically to effect the sideways movement of the molds and the advance and withdrawal of the ejector-unit with the measuring-box and blades carried thereby.

8. In molding apparatus of the type specified the combination with a pressure-plunger of two trough-shaped molds, movable sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors movable as a single unit in a direction transverse to the path of the mold into and out of the spaces which will in turn be occupied by the throughway of the side-stepped mold, a continuously-running driving member, means operated by said member periodically to effect the advance and withdrawal of the ejector-unit, a crank driven from the continuously-running member and engaging a slotted link guided for reciprocation in a direction at right-angles to the axis of rotation of the crank and having its slot of such width as to provide a dwell of the link before each reversal of its movement, and means to transmit the reciprocatory movement of the link aforesaid to the molds.

9. In molding apparatus of the type specified the combination with a pressure-plunger of two trough-shaped molds, movable sideways as a unit to bring each mold in turn under the pressure-plunger as the companion mold is side-stepped therefrom, fixed walls so shaped and positioned as to close the open ends of the mold which is under the plunger but to be clear of the ends of the companion mold, two ejectors movable as a single unit in a direction transverse to the path of the molds into and out of the spaces which will in turn be occupied by the throughway of the side-stepped mold, a continuously-running driving member, means operated by said member periodically to effect the advance and withdrawal of the ejector-unit, a yoke-member guided for reciprocation in a straight-line path and having two opposed faces separated by a gap and extending transversely to the path of the yoke, a crank rotatable by the continuously-running member aforesaid about an axis at right-angles to the path of the yoke, said crank being arranged to impart a reciprocatory movement to the yoke by engagement first with one of the opposed faces thereof and then with the other and to provide a dwell of the yoke between the disengagement of one face and the engagement with the other, and means to transmit the reciprocatory movement of the yoke-member to the molds.

10. In molding apparatus of the type specified the combination with a pressure-plunger of a trough-shaped mold having a bottom-part which is slidable vertically within the mold, means to move said mold sideways clear of the pressure-plunger, fixed walls so shaped and positioned as to close the open ends of the mold when the latter is under the plunger but to be clear of said ends when the mold is side-stepped, an ejector, means to move said ejector in a direction transverse to the sideways movement of the mold into and out of the space occupied by the throughway of the trough when the mold is in the side-stepped position, and means located beneath the mold and operative to impart a rapid reciprocating movement to the bottom-part of the mold when the latter is under the plunger.

11. In molding apparatus of the type specified the combination with a plurality of pressure-plungers of a plurality of pairs of trough-shaped molds arranged in line with the same number of mold-pairs as there are plungers, means to move said molds sideways as a single unit so as to bring alternate molds of each pair under a pressure-plunger as the companion molds are side-stepped therefrom, fixed walls so shaped and positioned as to close the open ends of the molds which are under the pressure-plungers but to be clear of the ends of the companion molds, a plurality of ejectors corresponding in number to the side-stepped positions of the molds and means to move said ejectors as a single unit in a direction transverse to the path of the molds into and out of the spaces which will in turn be occupied by the throughways of the side-stepped molds.

12. In molding apparatus of the type specified the combination with a pressure-plunger of two trough-shaped molds movable sideways as a single unit to bring each mold in turn under said plunger as the companion mold is side-stepped therefrom, a vertically-movable bottom pallet for each mold, fixed walls so shaped and positioned as to close the open ends of the mold which is under the plunger but to be clear of the ends of the companion mold, two ejectors movable as a single unit, in a direction transverse to the path of the molds, into and out of the spaces which will in turn be occupied by the throughway of the side-stepped mold, mechanism located below the molds for imparting a rapid reciprocatory movement to the bottom pallet of the mold under the plunger, a continuously-running driving member and means operated from said continuously-running member to effect in step the periodic rise and fall of the pressure-plunger, the throwing in and out of operation of the reciprocating mechanism for the mold-bottoms, the side-stepping of the molds and the advance and withdrawal of the ejector-unit.

In testimony whereof I affix my signature.

JOHN STANLEY HARRISON.